United States Patent
Chaudhari et al.

(10) Patent No.: US 8,224,649 B2
(45) Date of Patent: Jul. 17, 2012

(54) METHOD AND APPARATUS FOR REMOTE COMMAND, CONTROL AND DIAGNOSTICS OF SYSTEMS USING CONVERSATIONAL OR AUDIO INTERFACE

(75) Inventors: Upendra V. Chaudhari, Briarcliff Manor, NY (US); Ryan L. Osborn, White Plains, NY (US); Jason W. Pelecanos, Ossining, NY (US); Ganesh N. Ramaswamy, Ossining, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 10/858,083

(22) Filed: Jun. 2, 2004

(65) Prior Publication Data

US 2005/0273339 A1 Dec. 8, 2005

(51) Int. Cl.
*G10L 11/00* (2006.01)
(52) U.S. Cl. ........ 704/270; 704/246; 704/247; 704/251; 704/252; 704/275
(58) Field of Classification Search .................. 704/275
See application file for complete search history.

(56) References Cited

U.S. PATENT DOCUMENTS

| | | | | |
|---|---|---|---|---|
| 6,058,366 | A | * | 5/2000 | Tarkiainen et al. ........... 704/270 |
| 6,161,090 | A | * | 12/2000 | Kanevsky et al. ............ 704/246 |
| 6,173,441 | B1 | * | 1/2001 | Klein ............................ 717/142 |
| 6,418,199 | B1 | * | 7/2002 | Perrone ..................... 379/88.01 |
| 6,718,043 | B1 | * | 4/2004 | Boesen ........................ 381/314 |
| 6,721,705 | B2 | * | 4/2004 | Kurganov et al. ......... 704/270.1 |
| 6,832,196 | B2 | * | 12/2004 | Reich ........................ 704/270.1 |
| 7,054,811 | B2 | * | 5/2006 | Barzilay ...................... 704/246 |
| 7,242,752 | B2 | * | 7/2007 | Chiu .......................... 379/88.04 |
| 2003/0093334 | A1 | * | 5/2003 | Barzilay ........................ 705/26 |
| 2003/0110040 | A1 | * | 6/2003 | Holland et al. ............... 704/275 |

* cited by examiner

*Primary Examiner* — Leonard Saint Cyr
(74) *Attorney, Agent, or Firm* — Salehi Law Group; Anne V. Dougherty

(57) ABSTRACT

A method and apparatus for remote access to a target application is disclosed where a system administrator may establish telephonic contact with an interactive voice response system and obtain access to the target application by speech communication. The interactive response system may authenticate the system administrator by implementing various measures including biometric measures. Once access is granted, the interactive response system may broker a communication between the target application using text/data and the system administrator using natural language.

26 Claims, 2 Drawing Sheets

METHOD AND APPARATUS FOR REMOTE COMMAND, CONTROL AND DIAGNOSTICS OF SYSTEMS USING CONVERSATIONAL OR AUDIO INTERFACE

FIELD OF THE INVENTION

The present invention generally relates to the remote administration, diagnostics, maintenance, command and control of a target system.

BACKGROUND OF THE INVENTION

Conventional target application systems often require remote diagnostics and administration. In such systems the system administrator accesses the system from a remote location by gaining access to the network. Conventionally, the network is a computer network compatible with a TCP/IP infrastructure. Accessing the network involves various authentication measures including public key inscription ("PKI"), access control (i.e., limiting access to various network resources) and other means required to insure network integrity. By providing the network administrator high level of access to the system, the administrator is enabled to diagnose, modify or conduct routine maintenance to the system from a remote location.

There is a need to provide the system administrator access to the system without relying on the pre-existing computer network including networks having TCP/IP protocol with various security means.

SUMMARY OF THE INVENTION

A disadvantage of the conventional systems is its limited ability to prevent unintended intrusions. While firewalls and other security measures may substantially reduce the problem, a breach in security and unauthorized intrusions can be fatal to the target application system. For example, the target application may be infected with a virus, a worm or a Trojan horse causing system shutdown. In addition, the target application may be flooded by bogus traffic to one or more of its nodes rendering it inoperable. Regardless of whether the administrator's key has been compromised or whether access to the target application was gained through other means, any of the above-mentioned scenarios will render it difficult if not impossible for the system administrator to effectively diagnose and maintain the target application from a remote location.

Another disadvantage of such systems is the potential for unintended denial of access. Should the target system or the underlying network be corrupted to deny remote access requests, the administrator will not be able to remedy the problem and maintain operability. Thus, denial of access is typically rather costly.

Finally, while a network administrator may sidestep denial of access or other impediments by gaining physical access to the network and conducting on-site reparations, in some situation this approach may not be possible. For example, if target application is a satellite or an otherwise out-of-reach application, the administrator will not have access to the system and revitalization will not be possible.

In one exemplary embodiment, a method and apparatus is disclosed to enable remote or local system administration through voice access. Voice access may be implemented using a personalized and conversational Interactive Voice Response ("IVR") system adapted to interface with a system administrator and the target application. The IVR may enable system administrator to use speech (including natural language and voice) to perform system maintenance, system tuning and fault location. Conversational speech interface may also be used to interactively report the remote system's status or to execute different system configurations. The voice communication is conventionally implemented through a telephony network (e.g., PSTN), direct microphone input, cellular communication or an internet based voice communication. The speech-based interface provides a number of advantages over a data-based network interface. For example, the speech-based interface is not exposed to port attacks, calculated memory leak, buffer overflow and denial of access which plague conventional data-based network control systems.

In a speech-based application, the network access may be configured to receive a voice access request, authenticate the voice access request against a database and permit/deny network access based on the authentication results. Upon granting access to the network, the system administrator is enabled to perform local diagnostics, system maintenance and system configuration by voice access.

According to another exemplary embodiment, an interactive voice request is used by a remote computer to interface with the target application and conduct system maintenance, system tuning and fault location.

Accordingly to still another aspect of the disclosure, the system uses IVR to self-tune its communication parameters. For example, the system may enable the IVR to communicate with itself over the communication channel to perform self diagnostics and assess communication channel threshold for future reference.

A system according to one exemplary embodiment of the disclosure may include a computer system capable of voice interface (e.g. telephony interface) and a conversational interface involving one or more of the following functionalities: automatic speech recognition, text/data to speech conversion, speech to text/data conversion, speaker recognition, natural language processing, language identification and emotion detection. The WR computer may optionally be co-located with, and interfaced to, the remote system running the core functions of interest. The IVR may include a software package running on the same hardware as the remote system. When access to the remote system is requested, a dialog may be established with the IVR to authenticate and verify the caller's access. Once authenticated, the caller may be provided with access to the remote system.

DETAILED DESCRIPTION

The invention generally relates to the problem of limited administrative and diagnostics access to systems where no network is available or when limited external access is available for accessing a secure network. The limited access may be due to non-existent network infrastructure or due to security settings that are aimed at preventing unauthorized access. In addition, some systems may be installed in unmanned locations where even local technicians are not available.

For preventative maintenance and for correcting malfunctions, it is important to check the status of the remote system and gather diagnostics information. It is also useful to gather operational information that is not related to maintenance, such as usage patterns and system logs. Although a network connection may be unavailable, a voice connection (such as a telephone line) is likely to be available. In addition, a voice connection is much less likely to be blocked to outside access; that is, it is always possible to call the target application directly through PSTN. Hence, the exemplary embodiments of the disclosure may provide an alternative method of accessing devices in remote locations using a conversational interface. Data-based connections require using a remote device such as a computer or a hand held device which typically run on a software platform. In contrast, remote device control and diagnostics via voice can be implemented using a telephone line to converse directly with a maintenance and diagnostics application. Thus, a voice mechanism may provide an alternative or a backup mechanism for maintenance and control when data networks are compromised or corrupted.

Figure 1:
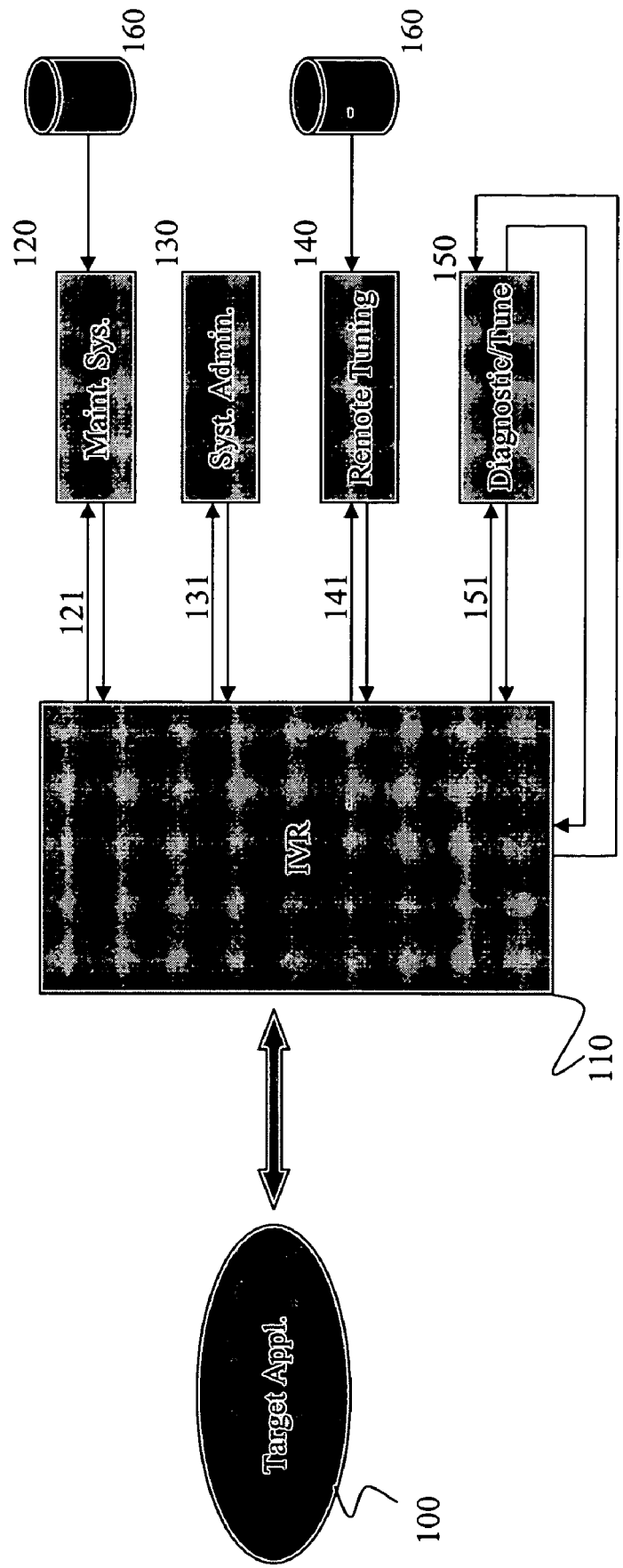
FIG. 1 shows a diagnostics and self-tuning system according to one exemplary embodiment of the disclosure.

FIG. 1 shows a diagnostics and self-tuning system according to one exemplary embodiment of the disclosure. In the exemplary embodiment of FIG. 1, the interactive voice response and system control 110 acts as a gatekeeper to target application system 100. IVR 110 also provides an interface between target application 100 and remote devices seeking communication with the target application. FIG. 1 shows remote devices including maintenance system 120, system administrator 130, remote tuning system 140 and self diagnostic and self-tuning system 150.

Target application 100 may be any of a number of various application or services including credit card verification service, banking and trading applications, customer self service, automated shopping, etc.

IVR 110 may be an automatic interactive voice response software adapted to receive, authenticate and recognize speech data from any of outside devices shown in FIG. 1 or any other devices capable of providing, either directly or indirectly, speech or simulated speech. For Example, while system administrator 130 may directly interact with target application 100 vis-à-vis IVR 100, each of maintenance system 120 and remote tuning 140 are coupled to speech database 160. In this manner, each of maintenance system 120 and remote tuning 140 may convert data-based information to speech-based information for communication with WR 100. Software applications directed to converting data to speech may be used in conjunction with speech database 160.

Figure 2:
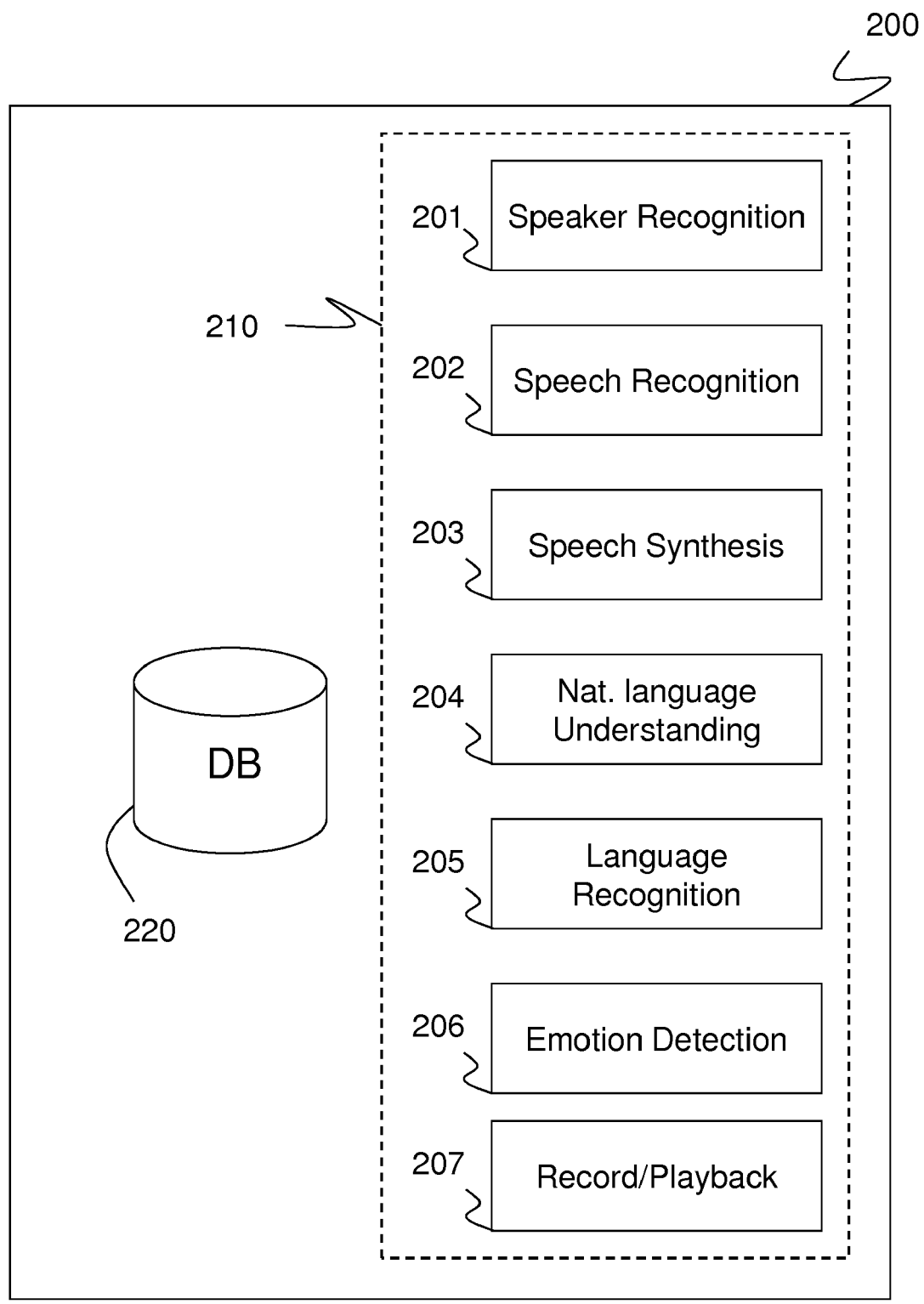
FIG. 2 shows an exemplary IVR according to one exemplary embodiment of the disclosure.

FIG. 2 shows an exemplary IVR according to one exemplary embodiment of the disclosure. In order to provide additional security measures, IVR 200 may be customized to include the desired functionalities. In the exemplary embodiment of FIG. 2, for example, various modules are added to furnish IVR 200 with speaker recognition system 201, speech recognition system 202, speech synthesizer 203, natural language understanding 204, language recognition software 205, emotion detection software 206 and speech recording playback system 207. In addition to authenticating the caller, these modules enable IVR 200 to act as a true interface by interacting with the caller in real time.

Speech synthesizer 203 is provided to enable IVR 200 to respond to the calling party in spoken language. Alternatively, pre-recorded audio files containing spoken messages may be played by the IVR 200. Speaker recognition module 201 may be added to expedite the authentication process using conventional biometrics criteria to identify the caller's voice. Speech recognition module 202 may include conventional speech recognition software adapted to convert text data into recognizable human speech. Speech recognition module 202 may also implement knowledge match measures to authenticate the caller. Natural language understanding 204 may be used to extract meaningful user messages from the recognized text. In addition, a language recognizer 205 may be used to identify the spoken language and an emotion detector 206 may be used to estimate the emotional state from the speech data.

Finally, speech recording/playback module enables recording and playback of certain segmented speech. This module is particularly helpful for performing routine operations and reporting thereon.

Referring to FIG. 1, system administrator 130 may use existing PSTN infrastructure (or wireless system) to conduct remote maintenance or system modification to target application. System administrator 130 telephonically connects to IVR 110. Prior to providing direct access to target system 100, IVR 110 may be programmed to authenticate system administrator 130. A customized user interface (FIG. 2, interface 210) may be implemented to achieve this goal. For example, a speaker recognition software may identify the system administrator and grant immediate access to target application system. In the absence of a speaker recognition software, various authentication measures may be implemented to authenticate the caller. Once authenticated, IVR may act as an interface between target application 100 and system administrator 130 by brokering a simplex (not shown) or a full duplex communication 131 between the caller (i.e., remote device) and target application The integrated approach enables conversational interface to be further personalized to the user according to the user's profile.

One such application includes the so-called backdoor entry for existing conversational telephony systems. In one exemplary embodiment, backdoor entry enables an administrator to call the same application that any another user may call (e.g. a credit card activation service). By speaking a secret phrase or by having the system identify the user's voice biometric characteristics, the administrator is switched to administration mode, is authenticated, and is allowed to perform administrator functions. Such functions may include, for example, re-programming the application, obtaining diagnostics, and performing system maintenance. The system may be configured to act in duplex; that is, calls may be made by IVR 110 to administrator when there's a problem. In addition, IVR 110 may be programmed to progress through a contingency plan of calling a list of destinations and leaving messages.

Still another exemplary implementation of the exemplary embodiment described above is the so-called artificial passenger. Here, a mechanic may call the vehicle (or the vehicle may call the driver) if a problem arises. Examples include the vehicle calling or messaging the driver to inform the driver of a flat tire, a wheel imbalance or engine-related problems exist. In addition, the car may automatically call emergency roadside service in the event of a detected collision or in a situation where the driver is unable to place such a call.

The user specific style of interaction with a remote device may be governed by the type of request made, the remote devices current system privileges, the current status of the system, and for human system administrators, the personality or the emotional state of the caller. For example, IVR 110 may be configured such that if target application is in a critical error state, the system administrator will be interactively prompted to address the critical error before proceeding to other maintenance tasks.

In one exemplary embodiment of the disclosure, control criteria are directly communicated between WR 110 and system administrator 130. An advantage of this method resides in that such interactions may be tailored specifically to the type of administrator. In contrast to accessing digital networks using remote machine connection (i.e., data-based communication), this method may use voice communication between human and machine to perform administrative functions. An example includes providing the administrator with the ability to hear what is occurring in the local environment. If an audible machine is running in the area, the user would be able to determine immediately over the phone if there is perhaps a mechanical problem by listening to the machine itself.

The exemplary embodiments of the invention are not limited to human administrators. In one exemplary embodiment, the system is configured to respond to a machine/computer administrator. Automated robot or computer based systems may be designed to interact with the automated speech interaction system and to change remote (or local) device operating parameters, to maintain, tune and diagnose such speech or non-speech based devices in accordance with the principles of the disclosure. For example, maintenance system 120 in FIG. 1 may be a machine/computer system adapted to maintain and control target application 100 vis-à-vis IVR 110. To communicate with IVR 110 maintenance system 120 implements speech data 160 to translate machine data into speech. Thus, pre-recorded commands may be provided to WR 110 through channels 121.

In still another exemplary embodiment, system control may be implemented by IVR 110 and another computer system. For example, external IVR systems (e.g., remote tuning system 140) may call a target application system and send pre-recorded speech utterances over telephone line 141. As in maintenance systems 120, remote tuning systems 140 may use speech database 160 to communicate in a form acceptable to IVR 110.

The target application system 110, knowing the exact utterances may compare the qualitative factors relating to the received speech signal (effected by the transmission channel) with the original speech content, and extract degradations and distortions inherent in communication medium 141. Using these irregularities as a baseline, IVR 110 may further diagnose any system problems and tune parameters in the speech engines, ensuring that the system is running at its optimal performance. This process also enables operating thresholds to be adjusted and the known error rates to be confirmed. Because there are multiple systems calling from different locations, there will be different telephony channel properties. Hence, after a new system installation, this type of setup may be used to rapidly determine the true running error rate of the system and confirm that the incoming line is of high quality and related audio hardware is properly configured and is not defective.

In addition, remote IVR and/or remote tuning machines may be configured to periodically contact each other to ensure that each system in a network is operationally performing. A computer calling IVR 110 may, for example, be used to perform routine maintenance and monitoring of the target system using voice or other audio based communication means. System tuning may also be achieved by a computer dialing the host system and providing a set of key speech utterances to the host system allowing it to analyze, adjust or update the appropriate maintenance parameters.

In one exemplary embodiment, the system diagnosis may be implemented by configuring IVR 110 to contact itself and perform self-diagnosis analysis on target system 100. This may be achieved in a similar manner to the exemplary embodiment where multiple systems contact a target IVR except the target IVR is transmitting and receiving the calls over its own channel (i.e., channel 151 in FIG. 1). This solution is a self contained version of the previously-discussed exemplary embodiment in that routine system maintenance and monitoring may be self-regulated. One advantage of this exemplary embodiment is that IVR 110 may be configured to call itself (self-monitoring) to determine whether target application 100 is operating according to a pre-defined specification. There are a number of relevant applications for such an apparatus. Examples may include self tuning of conversational systems, and also functional testing where the system calls itself to verify that it operates correctly end to end.

For example, IVR 110 may be used to pass a number of speech utterances or audio content over communication lines 151/152 and receive the call once it has passed through the channel. By monitoring the quality of the received speech signals, IVR 110 may determine whether the channel provides sufficient quality. In addition, operating thresholds may be changed according to the channel performance. A current measurement of the system error rates for speech recognition and speaker authentication may also be provided using such tools.

In an exemplary deployment process IVR 110 reports a detected problem (for example with target application 100) to a repository. A central monitoring service accesses the repository. The central monitoring service may be programmed to access the repository on regular intervals or upon receiving an indication. The entries in the repository may be set by the monitoring process as "commands". The monitoring system then starts/stops/resets system parameters. Alternatively, the monitoring system may act as a watchdog and report the problem to another entity vested with authority to access and remedy the problem. The telephony voice system interfaces with the central monitoring process and the monitoring process may initiate an outbound call using the telephony voice system for reporting the critical events. The overall performance may be monitored by a third party on a regular basis or as an audit.

While the invention is described in relation to specific exemplary embodiments, it should be understood that the principles of the invention are not limited thereto and encompass variations and permutations thereof.

What is claimed is:

1. A method for providing remote access to a target application, the method comprising:
   providing an interactive voice response system configured to interface the target application and a system administrator;
   at the interactive voice response system, receiving a request from the system administrator to access the target application;
   authenticating the system administrator using at least one authentication routine taken from the group consisting of: speaker recognition, speech recognition and natural language question/response; and
   if authenticated, enable the system administrator to access the target application using natural language to perform an administrative function defined by re-programming the application, obtaining diagnostics, and performing system maintenance;
   wherein the authenticating step further comprises using a secret phrase or a biometric characteristic.

2. The method of claim 1, wherein the request is in the natural speech form.

3. The method of claim 1, wherein the system administrator uses speech to communicate with the interactive voice response system.

4. The method of claim 1, wherein the system administrator is a computer configured to communicate using natural language.

5. The method of claim 1, wherein the system administrator is the interactive voice response system.

6. The method of claim 5, wherein the system administrator is configured to contact itself.

7. The method of claim 1, further comprising the step of providing system information on target application to the system administrator upon authentication.

8. A non-transitory machine-readable medium having stored thereon a plurality of executable instructions to be executed by a processor to implement a method for providing a system administrator access to a target application, the method comprising:
    providing an interactive voice response ("IVR") system for interfacing the target application and the system administrator;
    receiving a request for accessing the target application at the IVR in speech form;
    authenticating the system administrator by using at least one authentication parameter including speaker recognition, speech recognition, or natural language question/response;
    granting access to the target application to perform an administrative function including making program system modifications, obtaining diagnostics, and performing system maintenance, if the system administrator is authenticated;
    wherein the authenticating step further comprises using a secret phrase or a biometric characteristic.

9. The machine-readable medium of claim 8, wherein the IVR is configured to receive the request in natural speech form.

10. The machine-readable medium of claim 8, further comprising the IVR communicating at least one authentication parameter with the system administrator in natural speech form.

11. The machine-readable medium of claim 8, further comprising the IVR communicating a plurality of authentication parameters with the system administrator to determine authorization and access level of the system administrator.

12. The machine-readable medium of claim 8, wherein granting access to the target application further comprises interfacing between the system administrator and the target application.

13. The machine-readable medium of claim 8, wherein the system administrator is a remote computer.

14. The machine-readable medium of claim 8, wherein the system administrator is the IVR.

15. The machine-readable medium of claim 8, further comprising assessing a threshold for the communication medium by comparing the request in speech form with at least one known request in speech form.

16. An apparatus for providing a remote administrator access to a target application, the apparatus comprising an interactive voice response ("IVR") system for receiving an access request from the remote administrator, wherein the IVR is configured to receive access request in speech form, authenticate the remote administrator prior to granting access to the target application to perform an administrative function defined by: re-programming the application, obtaining diagnostics, and conducting remote maintenance, and, once access is granted, communicate the target system configurations to the remote administrator in speech form;
    wherein the authenticating step further comprises using a secret phrase or a biometric characteristic with an authentication routine taken from the group consisting of: speaker recognition, speech recognition and natural language question/response.

17. The apparatus of claim 16, wherein the IVR further comprises a speaker recognition device for identifying the remote administrator by comparing a speech pattern with a known speech pattern.

18. The apparatus of claim 16, wherein the IVR further comprises a speech recognition device for converting speech to at least one of text or data.

19. The apparatus of claim 16, wherein the IVR further comprises a speech recognition device for converting at least one of text or data to speech.

20. The apparatus of claim 16, wherein the IVR further comprises a database of speech patterns for communicating with the remote administrator.

21. The apparatus of claim 16, wherein the IVR further comprises an emotion detection device.

22. The apparatus of claim 16, wherein the IVR further comprises a language recognition device that identifies which language is spoken by the remote administrator.

23. The apparatus of claim 16, wherein the IVR further comprises a speech synthesizer device to speak to the remote administrator.

24. The apparatus of claim 16, wherein the IVR is adapted to provide data communicate with the target application.

25. The apparatus of claim 16, wherein the IVR is adapted to convert data communication from target application to speech form for communication with the system administrator.

26. A system for providing remote access to a target application, the system comprising:
    an interactive voice response unit ("IVR") configured to interface the target application and a system administrator so that the system administrator can perform an administrative function including re-programming the application, obtaining diagnostics, and performing system maintenance, the IVR authenticating the system administrator before interfacing the target application and the system administrator;
    a speech database;
    a maintenance unit configured to maintain the target application, the maintenance unit communicatively coupled to the speech database so that machine data can be converted to speech data for communication with the IVR;
    and a remote tuning unit configured to transmit pre-recorded speech utterances to tune the target application, the remote tuning unit communicatively coupled to the speech database so that machine data can be converted to speech data for communication with the IVR;
    wherein the authenticating step further comprises using a secret phrase or a biometric characteristic with an authentication routine taken from the group consisting of: speaker recognition, speech recognition and natural language question/response.

* * * * *